United States Patent

Bement

[15] 3,670,559

[45] June 20, 1972

[54] LINEAR EXPLOSIVE COMPARISON

[72] Inventor: Laurence J. Bement, Newport News, Va.

[73] Assignee: The United States of America as represented by the Administrator of the National Aeronautics and Space Administration

[22] Filed: June 17, 1971

[21] Appl. No.: 154,094

[52] U.S. Cl. .................................................................73/35
[51] Int. Cl. .........................................................G01n 33/22
[58] Field of Search .............................................73/35, 167

[56] References Cited

UNITED STATES PATENTS

| 253,914 | 2/1882 | Dean | 73/35 |
| 3,027,751 | 4/1962 | Jones | 73/35 |
| 3,263,489 | 8/1966 | Schimmel et al. | 73/35 |

Primary Examiner—James J. Gill
Attorney—Howard J. Osborn, et al.

[57] ABSTRACT

An apparatus for quantitatively determining the performance of linear explosives, mild detonating fuse and flexible linear shaped charges. Elongated explosive samples are detonated in a test fixture that is provided with means for sensing the explosive blast energy, explosive cutting ability, and detonation propagation rate.

10 Claims, 4 Drawing Figures

PATENTED JUN 20 1972

INVENTOR.
LAURENCE J. BEMENT
BY
ATTORNEYS

INVENTOR.
LAURENCE J. BEMENT

LINEAR EXPLOSIVE COMPARISON

ORIGIN OF THE INVENTION

This invention was made by an employee of the National Aeronautics and Space Administration and may be manufactured and used by or for the Government of the United States for governmental purposes without the payment of any royalties thereon or therefor.

This invention relates to an apparatus and method for quantitatively determining the performance of linear explosives, mild detonating fuse and flexible linear shaped charges. The use of various linear type explosive charges is becoming of ever-increasing importance in flight research programs to perform such functions as ignition, separation, deployment, ejection and the like. Since the success of various aerospace missions and even human lives depend upon the optimum operation of various devices of this type, it is extremely important to utilize predictable and known characteristic explosive charges for various flight research programs. Also, the different environments under which some devices may be required to operate can change the performance thereof and suitable static test operations must be performed to determine the best performing linear explosive devices. For example, an unmanned Mars exploration program is now being developed in this country and a biological sterilized lander vehicle is anticipated for this program. To achieve biological sterilization this lander vehicle will be subjected to a 125° C., 24.5-hour heat cycle. Future space programs are also expected to require ordnance items that will withstand long-term high-temperature exposure in the vicinity of radioisotope thermal-electrical generators, thermal extremes of deep space exposure to sunlight and darkness, and reentry heating.

It is therefor an object of the present invention to provide an apparatus for testing candidate pyrotechnic devices and ordnance materials of the type required to perform after cyclic exposure to high temperatures.

Another object of the present invention is an apparatus for measuring the performance of linear explosives for explosive comparisons, explosive applications, engineering guidelines and determining the effects of environments on explosive performance.

Another object of the present invention is a method of measuring the performance of various explosives under variable environmental conditions.

According to the present invention, the foregoing and other objects are attained statistically through the test firings of 45.7 cm lengths of linear explosives, obtaining simultaneous energy output of the explosive, measurements of velocity of propagation, and its cutting, or rupturing, ability in a tapered aluminum plate. For comparison, various conventional explosives are loaded in both mild detonating fuse and flexible linear shaped charge configurations. The accuracies of the energy output measurements of the explosives are further substantiated by comparison to their respective calculated heats of detonation which predicts energy output in calories per gram.

The apparatus of the present invention includes a test stand housing a removable specimen holder formed from a steel bar. A groove is machined on each side of the specimen holder to conform to the linear explosive test specimen. After five firings on each side the bar is replaced to thereby minimize variance in test results due to explosive erosion. An aluminum witness plate is employed, tapered from 0.200 to 0.010 inch (5.08 to 0.25 mm) to evaluate explosive cutting ability. A steel hold-down plate is also utilized for the mild detonating fuse firings to produce a rigid backup and confinement for the tapered plate by providing an 0.125 inch (0.307 cm) bearing surface on each side of the explosive. No hold-down plate is necessary for the flexible linear shaped charge firings due to the directionality of the output.

Timing of the detonation propagation is accomplished by a timing circuit with timing wires being placed across the explosive at each end of the tapered plate and, upon arrival of the detonation, an electrical short circuit is produced. This short circuit triggers respective switches in the circuit to cause respective capacitors to discharge and, in turn, to produce a voltage that triggers an electronic timer gating circuit.

A more complete appreciation of the invention and many of the attendant advantages thereof will be readily apparent as the same becomes better understood by reference to the following detailed description when considered in connection with the accompanying drawings wherein.

Figure 1:
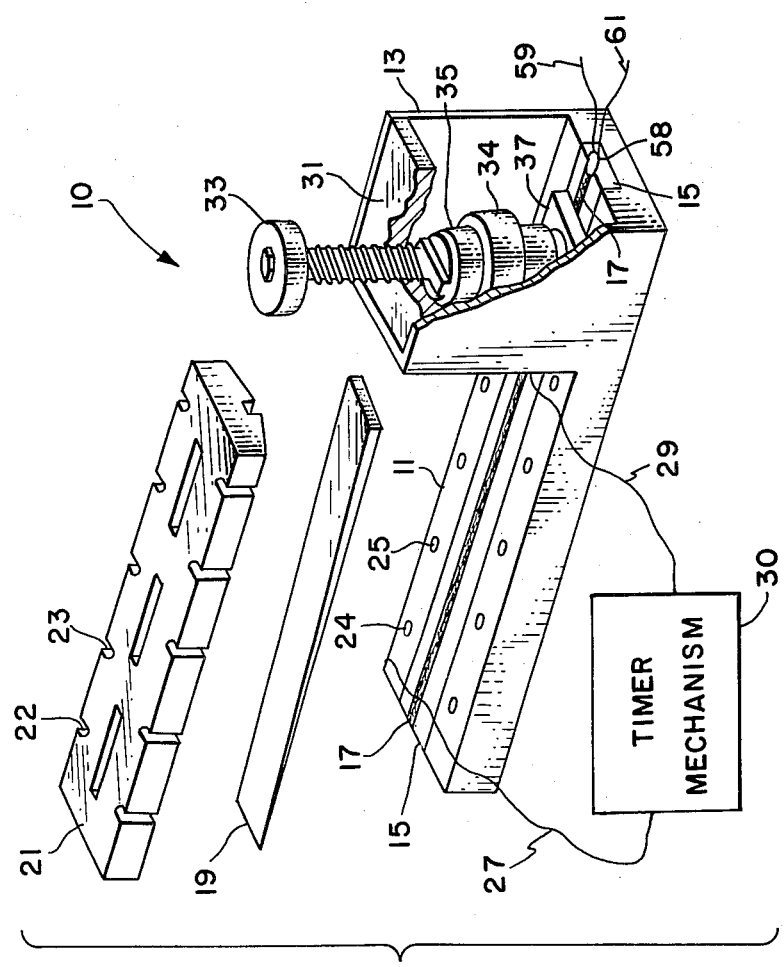
FIG. 1 is an exploded, part schematic, part cut away view of the apparatus of the present invention.

Referring now to the drawings wherein like reference numerals refer to like parts throughout the several views, and more particularly to FIG. 1, there is shown an explosive test fixture generally designated by reference numeral 10. Test figure 10 includes an elongated frame 11 with a vertically extending test stand 13 integrally formed at one end thereof. The frame 11 and test stand 13 are formed of hard steel for durability. A rectangular groove is machines along the length of frame 11 to receive an elongated specimen holder 15. Specimen holder 15 is formed of a 17–4P.H. steel bar or the like and is provided with a groove machined on each side thereof to conform to the linear explosive test specimen 17. Specimen holder 15 is tempered to maximum hardness, HR–900, or Rockwell 43 to 45, to minimize explosive erosion and is replaced after five firings on each side. A witness plate 19, formed of 2024–T4 aluminum, or the like, is disposed adjacent the test specimen 17, as will be further explained hereinafter. The witness plate can be used only once. Homogeneous aluminum with consistent grain orientation is preferred to eliminate errors due to variations in tear strength. The grain orientation utilized in the present invention was down the length of the tapered plate 19. A taper from 0.200 to 0.010 in (5.08 to 0.25 mm) over the length of 12 inches (3.05 cm) was employed in the present invention. A steel hold-down plate 21 is utilized to produce a rigid backup and confinement for tapered witness plate 19. The hold-down plate 21 is bolted rigidly to fixture 11 by suitable bolts, not shown, extending through grooves 22, 23 and others, not designated, into tapped openings 24, 25 and others, not designated, disposed along both sides of the length of fixture 11.

Timing wires 27 and 29 are placed across the explosive test specimen at each end of tapered plate 19 and, upon arrival of the detonation, an electrical short circuit is produced, as will be further explained hereinafter.

Test stand 13 is provided with a removable closure plate 31 at the open end thereof. Closure plate 31 is bolted or otherwise secured to test stand 13 and is provided with a central tapped opening therein for receiving a screw 33. Screw 33 bears against and serves with circular clamp 34 to maintain an energy sensor 35 in position within test stand 13. Energy sensor 35 is spaced from the end of the explosive specimen 17 to provide for maximum explosive forces being transmitted thereto. An aluminum interface plate 37 is maintained between energy sensor 35 and the explosive specimen 17 to provide a replaceable interface and prevent damage to the energy sensor mechanism. A high temperature resistant sealant, zinc chromate putty, is placed on the well-cleaned interface between the explosive 17 and interface plate 37 to provide a temporary seal during detonation. Experiments have shown that this seal substantially doubles the energy input to the energy sensor thereby increasing the accuracy that is obtainable in the comparative measurements of various explosives. To insure uniformity of positioning of the interface plate 37, the plate is compressed to approximately 750 pounds (3340 N) by torquing screw 33 through a rigid steel block in plate of the energy sensor 35.

Figure 2:
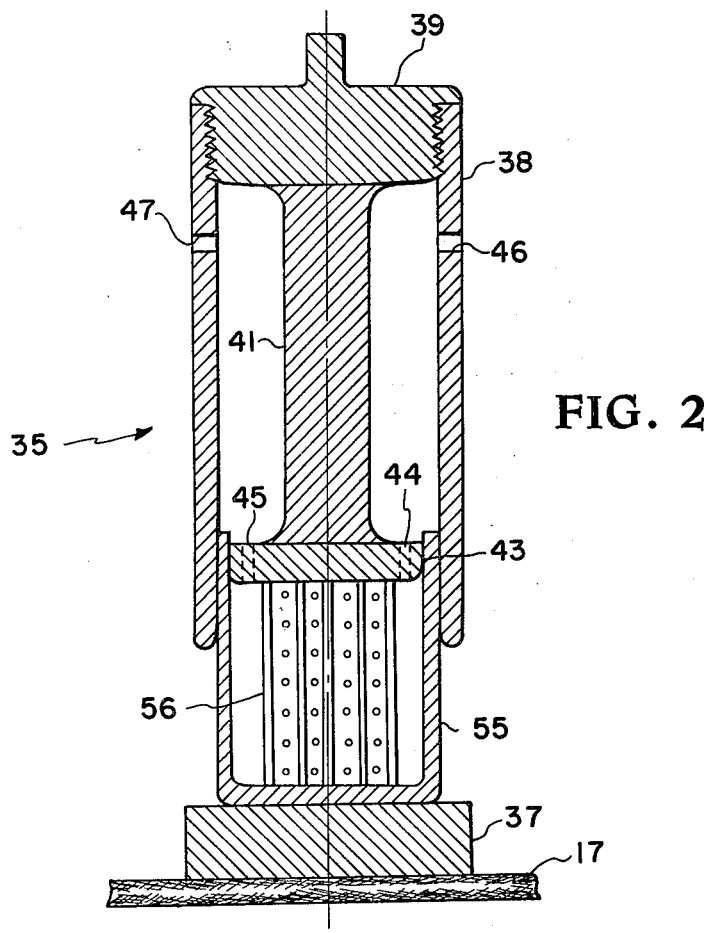
FIG. 2 is a sectional view of the energy sensor element of the apparatus shown in FIG. 1.
Figure 3:
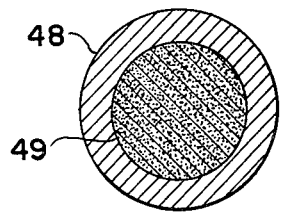
FIG. 3 is a cross section of an exemplary mild detonating fuse.

Referring now more particularly to FIG. 2, the details of energy sensor 35 will now be described. Energy sensor 35 includes a tubular housing 38 closed at one end by a threaded end cap 39. End cap 39 is provided with an integral shaft 41 and terminates in a circular flat bearing 43. A plurality of vent holes are provided adjacent the periphery of bearing 43, two of which are shown in FIG. 3 and designated by reference numerals 44 and 45. Tubular housing 38 is also provided with a row of vent holes around the periphery thereof two of which are shown and designated by reference numerals 46 and 47. Tubular housing 38 is slidably received by a cup-shaped piston 55. The closed end of piston 55 abuts against interface plate 37. Bearing surface 43 is slidably received within the open end of piston 55 and abuts against a section of aluminum honeycomb 56. The honeycomb is cut so that the cell thereof are axially alined with the circular bearing surface 43 and the base of the piston 55. Honeycomb of this type is commercially available in a wide variety of aluminum alloys, cell sizes, and wall thicknesses and provides a constant crush strength over most of its length. In a specific example of the present invention, a 5052 aluminum alloy honeycomb cut to include 49 whole cells, 0.125 inches (0.307 cm) cell size and with a 0.002 inch (0.0508 mm) wall thickness was employed. A crush strength of 640 pounds (2.850 Newtons) at a crush rate of 0.2 inches per minute (11.6 mm/sec) for about 0.85 inches (2.16 cm) was observed. For test purposes, the honeycomb with an original length of 1.25 inch (3.17 cm) was crushed 0.15 inch (0.381 cm) to obtain a crush strength calibration leaving 0.7 inch (1.78 cm) of usable length for energy measurement.

To insure uniformity of positioning of the interface plate 37, the plate is initially compressed to approximately 750 pounds (3340 N) by torquing screw 33 through a rigid steel block in place of the energy sensor 35. For testing, energy sensor 35 wit its calibrated honeycomb 56 is clamped into place in test stand 13 and preloaded to approximately 200 pounds (889 N) by torquing screw assembly 33. Poor procedures in the assembly of interface plate 37, the zinc chromate putty and energy sensor 35 can destroy the accuracy of the energy output data since explosive performance is very sensitive to confinement.

Figure 4:
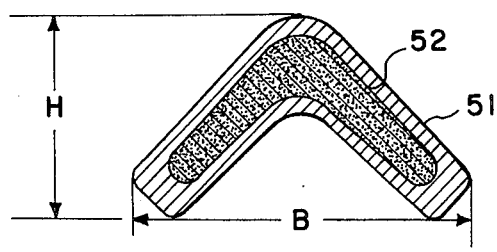
FIG. 4 is a cross section of a flexible linear shaped charge explosive.

Exemplary mild detonating fuse and flexible linear shaped charges are shown in cross section, respectively, in FIGS. 3 and 4. In FIG. 3 the metal sheath 48 surrounds a circular column of explosive 49. In FIG. 4, the metal sheath for the flexible linear shaped charge is designated by reference numeral 51, and the column of explosive is designated by reference numeral 52. Examples of compositions for explosive columns 49 and 52 are set forth in Table I hereinbelow. Also, examples of the metal sheath 48 and 51 and their dimensions (see FIGS. 3 and 4) are a lead-tin alloy and silver as set forth in Table I. The interior angle formed by sheath 51 is 90± 3° with an interior radius of 0.03 inch (0.76 mm) in the specific example shown; where MDF refers to mild detonating fuse,
FLSC refers to flexible linear shaped charge,
B refers to the base of FLSC, and
H refers to the height of the FLSC In operation, the linear explosive test column 17 is ignited by a two-grain PETN detonator, or the like, as designated by reference numeral 58 through ignition wires 59 and 61. An initial two-inch length of the test explosive 17 is provided to assure stable detonation before any measurements are taken. The next two-inch length provides an impulse to the energy sensor 39. The first timing wire 29 is short-circuited to ground by the explosion which starts the timer mechanism 30. The explosive test specimen 17 then cuts the tapered witness plate 19 to its maximum capability, and finally short circuits the second timing wire which stops the timer 30. The energy output is computed by multiplying the displacement of the honeycomb 56 by its known crush strength producing inch-pounds (joules). Cutting ability of the explosive test specimen is established by measuring the thickness of the witness plate 19 at the point where complete rupturing occurs for the mild detonating fuse, or where cracking ends for the flexible linear shaped charge. The time durations are measured by timer 30 to obtain velocity of propagation data over the 12.17 inch (30.9 cm) length of the test specimens. The time observed in the evaluation program of the explosives in Table I ranged from 34.7 to 50.5 microseconds.

After experimentation to establish the test techniques, the system accuracy and reproducibility were demonstrated by measuring the energy output, velocity of propagation and cutting ability of 10 lengths of the five different explosives described in Table I. The explosive performance comparison of energy output of the various types of explosives tested is set forth in Table II below:

TABLE II

| Explosive material and configuration | | Energy output: Inch pounds / Joules | | | |
|---|---|---|---|---|---|
| | | Max. | Ave. | Min. | Std. dev. |
| PETN | MDF | 360 / 5,857 | 330 / 5,370 | 273 / 4,441 | 25 / 407 |
| | FLSC | 298 / 4,848 | 264 / 4,295 | 225 / 3,660 | 21 / 342 |
| RDX | MDF | 317 / 5,157 | 294 / 4,783 | 270 / 4,393 | 13 / 212 |
| | FLSC | 253 / 4,116 | 229 / 3,726 | 210 / 3,417 | 14 / 228 |
| HNDS | MDF | 279 / 4,539 | 252 / 4,100 | 237 / 3,856 | 11 / 179 |
| | FLSC | 207 / 3,368 | 178 / 2,896 | 159 / 2,587 | 12 / 195 |
| HNSII | MDF | 243 / 3,954 | 214 / 3,482 | 202 / 3,287 | 14 / 228 |
| | FLSC | 179 / 2,912 | 159 / 2,587 | 135 / 2,196 | 13 / 212 |
| DIPAM | MDF | 212 / 3,449 | 195 / 3,173 | 187 / 3,042 | 8 / 130 |
| | FLSC | 182 / 2,961 | 160 / 2,603 | 133 / 2,164 | 15 / 244 |

TABLE I

Explosive specimens

| Explosive material | Conf. | Grains per foot | Dia. inches / mm. | B inches / mm. | H inches / mm. | Sheath mat. |
|---|---|---|---|---|---|---|
| PETN: Pentaerythritoltetranitrate | MDF | 8 | 0.078 / 1.98 | — | — | 94% Pb |
| | FLSC | 7 | — | 0.145 / 3.68 | 0.072 / 1.83 | 6% Sb |
| RDX: Cyclotrimethylenetrinitramine | MDF | 8 | 0.078 / 1.98 | — | — | 94% Pb |
| | FLSC | 7 | — | 1.137 / 3.48 | 0.071 / 1.80 | 6% Sb |
| HNDS: Hexanitrodiphenylsulfone | MDF | 8.4 | 0.081 / 2.06 | — | — | 94% Pb |
| | FLSC | 6.8 | — | 0.134 / 3.41 | 0.066 / 1.68 | 6% Sb |
| HNSII: Hexanitrostilbene II | MDF | 8.4 | 0.070 / 1.78 | — | — | 99.9% Ag |
| | FLSC | 6.8 | — | 0.140 / 3.56 | 0.074 / 1.88 | 99.9% Ag |
| DIPAM: Dipicramid | MDF | 8.5 | 0.069 / 1.75 | — | — | 99.9% Ag |
| | FLSC | 7.0 | — | 0.136 / 3.45 | 0.071 / 1.80 | 99.9% Ag |

The velocity of propagation comparison of the various explosives tested is set forth in Table III below:

TABLE III

| Explosive material and configuration | | Vel. of prop. {K feet/sec. / K meters/sec.} | | | |
|---|---|---|---|---|---|
| | | Max. | Ave. | Min. | Std. dev. |
| PETN | MDF | 22.5 / 6.86 | 22.4 / 6.83 | 22.2 / 6.77 | 0.11 / 0.033 |
| | FLSC | 26.9 / 8.20 | 26.3 / 8.02 | 25.7 / 7.83 | 0.10 / 0.030 |
| RDX | MDF | 24.8 / 7.56 | 23.8 / 7.25 | 22.8 / 6.95 | 0.52 / 0.160 |
| | FLSC | 26.1 / 7.96 | 25.5 / 7.77 | 25.2 / 7.68 | 0.22 / 0.067 |
| HNDS | MDF | 20.5 / 6.25 | 20.3 / 6.19 | 20.1 / 6.13 | 0.14 / 0.043 |
| | FLSC | 23.1 / 7.04 | 22.6 / 6.89 | 22.2 / 6.77 | 0.26 / 0.079 |
| HNSII | MDF | 24.0 / 7.32 | 23.3 / 7.10 | 22.6 / 6.89 | 0.45 / 0.137 |
| | FLSC | 24.7 / 7.53 | 23.8 / 7.25 | 23.3 / 7.10 | 0.45 / 0.137 |
| DIPAM | MDF | 25.4 / 7.74 | 24.1 / 7.35 | 23.4 / 7.13 | 0.55 / 0.167 |
| | FLSC | 25.2 / 7.68 | 24.7 / 7.53 | 24.3 / 7.41 | 0.28 / 0.079 |

The cutting ability comparison of the various explosives tested is set forth in Table IV below:

TABLE IV

| Explosive material and configuration | Cutting ability, inches×1,000, mm. | | | |
|---|---|---|---|---|
| | Max. | Ave. | Min. | Std. dev. |
| PETN: | | | | |
| MDF | 136–345 | 112–284 | 93–236 | 15–38.1 |
| FLSC | 157–399 | 142–361 | 134–340 | 5–12.7 |
| RDX: | | | | |
| MDF | 120–305 | 103–262 | 91–231 | 14–35.5 |
| FLSC | 148–376 | 131–333 | 118–300 | 7–17.8 |
| HNDS: | | | | |
| MDF | 113–287 | 105–267 | 90–229 | 8–20.3 |
| FLSC | 136–345 | 117–297 | 107–272 | 10–25.4 |
| HNSII: | | | | |
| MDF | 107–272 | 97–246 | 83–211 | 8–20.3 |
| FLSC | 110–279 | 99–251 | 89–226 | 7–17.8 |
| DIPAM: | | | | |
| MDF | 118–300 | 101–257 | 81–206 | 10–25.4 |
| FLSC | 123–312 | 112–284 | 97–246 | 8–20.3 |

In addition, the energy output measurement of PETN, RDX and DIPAM were compared to their theoretical heats of detonation, as calculated by the "$H_2O-CO-CO_2$ Arbitrary" and described in the article "Chemistry of Detonations–II," by Kamlet and Ablard, Journal of Chemistry and Physics, Vol. 48, page 36, 1968; and "Heat Resistant Explosives XIII Preparation and Properties of 3,3'-DIAMINO -2,2', 4,4', 6,6' -HEXANITRO-BIPHENYL (DIPAM)," by Dacors, Aldolph and Kamlet, NOLTR 62-82, May 16, 1962. The comparison of the energy sensor data with the theoretical heats of detonation of PETN, RDX and DIPAM is shown in Table V below:

TABLE V
[Heat of detonation vs. energy sensor data]

| | Material | Energy sensor | | Heat of detonation | | Ratio, percent |
|---|---|---|---|---|---|---|
| | | In.-lb. | G.-cal. | g.-cal./gram | g.-cal./2" lgth. | |
| 1 | PETN-MDF | 330 | 84.7 | 1,395 | 121 | 70 |
| 2 | PETN-FLSC | 280 | 71.8 | 1,395 | 106 | 68 |
| 3 | RDX-MDF | 294 | 75.6 | 1,204 | 104 | 73 |
| 4 | RDX-FLSC | 229 | 58.8 | 1,204 | 91.2 | 65 |
| 5 | DIPAM-MDF | 195 | 50.0 | 845 | 78.1 | 64 |
| 6 | DIPAM-FLSC | 160 | 41.2 | 845 | 64.1 | 64 |

The ratios of measured to theoretical values of energy output ranged from 64 to 73 percent. The energy sensor data is necessarily less than the theoretical maximum, since first, the honeycomb exhibits a higher dynamic strength over its static calibration. The exact strength increase cannot be determined without duplicating the input with a measureable force which is not possible. Secondly, no seal can be achieved by the explosive itself as it detonates with some leakage out its end. Thirdly, as the interface plate displaces, the zinc chromate putty seal is broken. Finally, small amounts of carbon particles were observed following detonation which indicates that not all of the available carbon has reacted, as described in the $CO-CO_2-H_2O$ arbitrary referred to hereinbefore.

The average energy outputs of the MDF samples ranged from 195 to 330 inch pounds (3,170 to 5,370 joules), and for the FLSC, 159 to 280 inch pounds (2,590 to 4,550 joules). The largest standard deviation for the MDF groups was 7.5 percent of the average for the group, and for the FLSC groups, 9.5 percent.

The range of average velocities of propagation recorded in this series was 20,380 to 26,265 feet (6,220 to 8,010 meters) per second. The reproducibility of this measurement is shown by the small standard deviations, the largest for MDF being 2.3 percent and for FLSC 1.9 percent of their respective group average.

The MDF materials produced ruptures, averaging from 0.097 to 0.112 inches (2.46 to 2.84 mm) with the largest standard deviation of 14 percent of its respective group average.

The FLSC materials produced cuts, averaging from 0.099 to 0.142 inch (2.51 to 3.61 mm) with the largest standard deviation of 7.5 percent of its respective group average.

It is thus seen that the present invention provides an apparatus and method of accurately measuring the performance of linear explosives for applications such as explosive comparisons, explosive applications, engineering design guidelines and determining the effects of environments on explosive performance. The apparatus is designed to test an 18-inch (45.7 cm) length of linear explosive in mild detonating fuse and flexible linear shaped charge configurations, obtaining simultaneous measurements of energy output, velocity of propagation, and the cutting ability for flexible linear shaped charges, or rupturing ability of mild detonating fuse in a tapered aluminum witness plate. The apparatus was demonstrated by firing 10 samples each of five different explosive materials. The average values of the energy outputs of the materials tested ranged from 159 to 330 inch pounds (2,590 to 5,370 joules) with a largest standard deviation of 9.5 percent of its respective group average. The energy output measured from PETN and RDX were 64 to 73 percent of their theoretical heats of detonation. The average velocities of propagation recorded in this series ranged from 20,380 to 26,265 feet per second (6,220 to 8,010 M/sec) with a largest standard deviation of 2.3 percent of its respective group average. The average cutting, or rupturing, ability of tapered aluminum plates ranged from 0.097 to 0.140 inches (2.46 to 3.56 mm) with a 14 percent standard deviation.

It is thus seen that the present invention provides an explosive test apparatus and process with an experimental capability of measuring the energy output of linear explosives with an accuracy that has not been heretofore achievable, plus providing at the same time reproducible measurements of velocity of propagation and cutting ability.

Although the invention has been described relative to a specific embodiment thereof, it is not so limited and the described specifics are for illustration of the principal and are not intended to serve as limitations thereof. Thus, modifications and variations in the specific embodiment described will be readily apparent to those skilled in the art in the light of the above teachings. It is therefore to be understood that within the scope of the appended claims, the invention may be practiced otherwise than as specifically described herein.

What is claimed as new and desired to be secured by Letters Patent of the United States is:

1. An apparatus for quantitatively determining the performance of linear explosives comprising:
  an elongated test fixture for housing a test linear explosive charge therein,
  igniter means disposed at one end of said test fixture for igniting the test linear charge,
  energy sensor means in fixed adjacency to said test fixture for determining the explosive blast energy of the test charge,
  means connected to said test fixture for measuring the explosive cutting ability of the test charge, and
  means connected to said test fixture for timing the detonation propagation of the test charge.

2. The apparatus of claim 1 wherein said test fixture is formed of an elongated steel frame,
- a longitudinal rectangular shaped channel formed in and extending the length of said frame,
- a rectangular steel specimen holder being slidably received by said channel, and
- a longitudinal extending groove formed in at least one side of said holder for receiving a test linear explosive charge therein.

3. The apparatus of claim 2 wherein said specimen holder is provided with a longitudinal groove formed in both sides thereof to permit testing of an explosive test specimen on alternate sides thereof.

4. The apparatus of claim 2 wherein said means connected to said test fixture for measuring the explosive cutting ability of the test linear explosive charge includes a tapered aluminum plate extending substantially the length of the test charge and a hold-down steel plate disposed against said tapered plate and releasably attached to said test fixture for maintaining said tapered plate in position against said specimen holder.

5. The apparatus of claim 1 including a hollow, vertically extending test stand integral with and spaced from one end of said test fixture,
- a tapped closure plate releasably secured to and closing said test stand at the uppermost end thereof,
- an adjustment screw being threadingly received by said tapped closure plate,
- said energy sensor means being disposed in said test stand and in contact with said adjustment screw,
- clamp means integral with said test stand and serving to receive said energy sensor means and, with said adjustment screw, serving to maintain said energy sensor means in fixed adjacency to said test fixture.

6. The apparatus of claim 5 wherein an aluminum interface plate is positioned between said energy sensor means and said test fixture and serving to direct the explosive forces of a test charge ignited in said fixture toward said energy sensor means.

7. The apparatus of claim 6 including a zinc chromate seal being disposed between said interface plate and said test fixture.

8. The apparatus of claim 6 wherein said energy sensor includes a tubular housing,
- a threaded end cap closing one end of said housing,
- an integral shaft formed with said end cap and terminating in a circular flat bearing,
- said tubular housing being slidably received by the open end of a cup-shaped piston,
- the interior of said open end of said cup-shaped piston receiving said flat bearing and the closed end of said piston abutting against said aluminum interface plate, and
- a honeycomb section disposed within said piston between said circular bearing surface and the bottom of said piston,
- said honeycomb section being cut so that the cells thereof are axially alined with said circular bearing surface and the base of said piston.

9. The apparatus of claim 8 wherein said honeycomb section is formed of 5052 aluminum alloy,
- said honeycomb being initially precrushed along a portion of its original length to obtain a crush strength calibration.

10. The apparatus of claim 1 wherein said means for timing the detonation propagation of the test charge includes a first timing wire extending across said test fixture and adapted to be electrically contacted when a test charge is fired therein to thereby initiate a short circuit,
- a timer mechanism electrically connected to said first timing wire and adapted to be started when said first wire is contacted, and
- a second timing wire also disposed across said test fixture and spaced from said first timing wire and adapted to be electrically contacted and initiate a second short circuit,
- said timer mechanism being also electrically connected to said second timing wire and adapted to stop when said second wire is contacted to thereby give a direct measurement of the rate of detonation propagation of a test charge fired in said test fixture.

* * * * *